United States Patent
Tan et al.

(10) Patent No.: US 9,055,190 B2
(45) Date of Patent: Jun. 9, 2015

(54) ARRANGEMENT OF MULTIPLE AUDIOVISUAL STREAMS

(71) Applicant: Hewlett-Packard Development Company, L.P., Houston, TX (US)

(72) Inventors: Kar-Han Tan, Sunnyvale, CA (US); Bowon Lee, Mountain View, CA (US); Ian N. Robinson, Pebble Beach, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

(21) Appl. No.: 13/873,500

(22) Filed: Apr. 30, 2013

(65) Prior Publication Data

US 2014/0320586 A1 Oct. 30, 2014

(51) Int. Cl.
*H04N 7/14* (2006.01)
*H04N 7/15* (2006.01)

(52) U.S. Cl.
CPC ........................................ *H04N 7/15* (2013.01)

(58) Field of Classification Search
None
See application file for complete search history.

(56) References Cited

U.S. PATENT DOCUMENTS

| 7,362,349 | B2 | | 4/2008 | Nelson et al. | |
|---|---|---|---|---|---|
| 7,982,762 | B2 | | 7/2011 | Chatting et al. | |
| 8,241,123 | B2 | * | 8/2012 | Kelly et al. | 463/34 |
| 8,274,544 | B2 | * | 9/2012 | Kurtz et al. | 348/14.01 |
| 8,279,254 | B2 | | 10/2012 | Goose et al. | |
| 8,300,081 | B1 | | 10/2012 | Sawyer | |
| 2002/0093531 | A1 | * | 7/2002 | Barile | 345/753 |
| 2009/0210804 | A1 | * | 8/2009 | Kurata et al. | 715/757 |
| 2013/0155174 | A1 | * | 6/2013 | Ferren et al. | 348/14.03 |
| 2014/0009562 | A1 | * | 1/2014 | Hegde et al. | 348/14.07 |

OTHER PUBLICATIONS

Bo Fu et al., "See-through Image Enhancement Through Sensor Fusion," (Research Paper), International Conference on Multimedia and Expo, Jul. 9-13, 2012, pp. 687-692, Available at http://vis.uky.edu/~gravity/publications/2012/see-through-icme2012.pdf (last accessed on Apr. 29, 2012).

* cited by examiner

*Primary Examiner* — Maria El-Zoobi
(74) *Attorney, Agent, or Firm* — International IP Law Group, PLLC (57) ABSTRACT

Techniques for multi-user videoconferencing are described herein. The techniques may include receiving two or more audiovisual streams from a remote site, wherein the two or more audiovisual streams are associated with video images to be rendered at a display of a local computing device. The techniques may include rendering the video images associated with the audiovisual streams at the local display in an arrangement such that a part of one of the video images associated with the audiovisual streams is relatively more opaque than a part of a video image associated with the other audiovisual stream, wherein the arrangement of video images associated with the audiovisual streams is based on cues, the cues comprising video signals indicating activity existing within an audiovisual stream.

20 Claims, 8 Drawing Sheets

ARRANGEMENT OF MULTIPLE AUDIOVISUAL STREAMS

BACKGROUND

The advent of the internet and networked computing systems in general has enabled networked communication techniques to become more widely used. Videoconferencing, wherein two locations communicate via audio/video signals, enables visual collaboration between two parties. Some videoconferencing systems enable two parties to interact as if each party is on either side of a sheet of glass. In some examples, the parties may interact with objects displayed on touch displays. Thus, the parties may more cohesively communicate information without requiring the parties to be in the same geographic location.

BRIEF DESCRIPTION OF DRAWINGS

Certain examples are described in the following detailed description and in reference to the drawings, in which.

DETAILED DESCRIPTION

The subject matter disclosed herein relates to video conferencing between multiple parties. Specifically, when parties at three or more different locations are video conferencing, incoming audiovisual streams from the remote sites are rendered as video images at a display of a local computing device and audio signals rendered at audio devices such as speakers. The incoming video images are arranged such that video images associated with an active party are more opaque than video images associated with relatively less active parties. The activity of a party is determined, in part, via cues indicating the activity of the remote sites. The arrangement of video images may enable a less confusing image to be presented to a party engaging in video conferencing with two or more remote sites.

Figure 1:
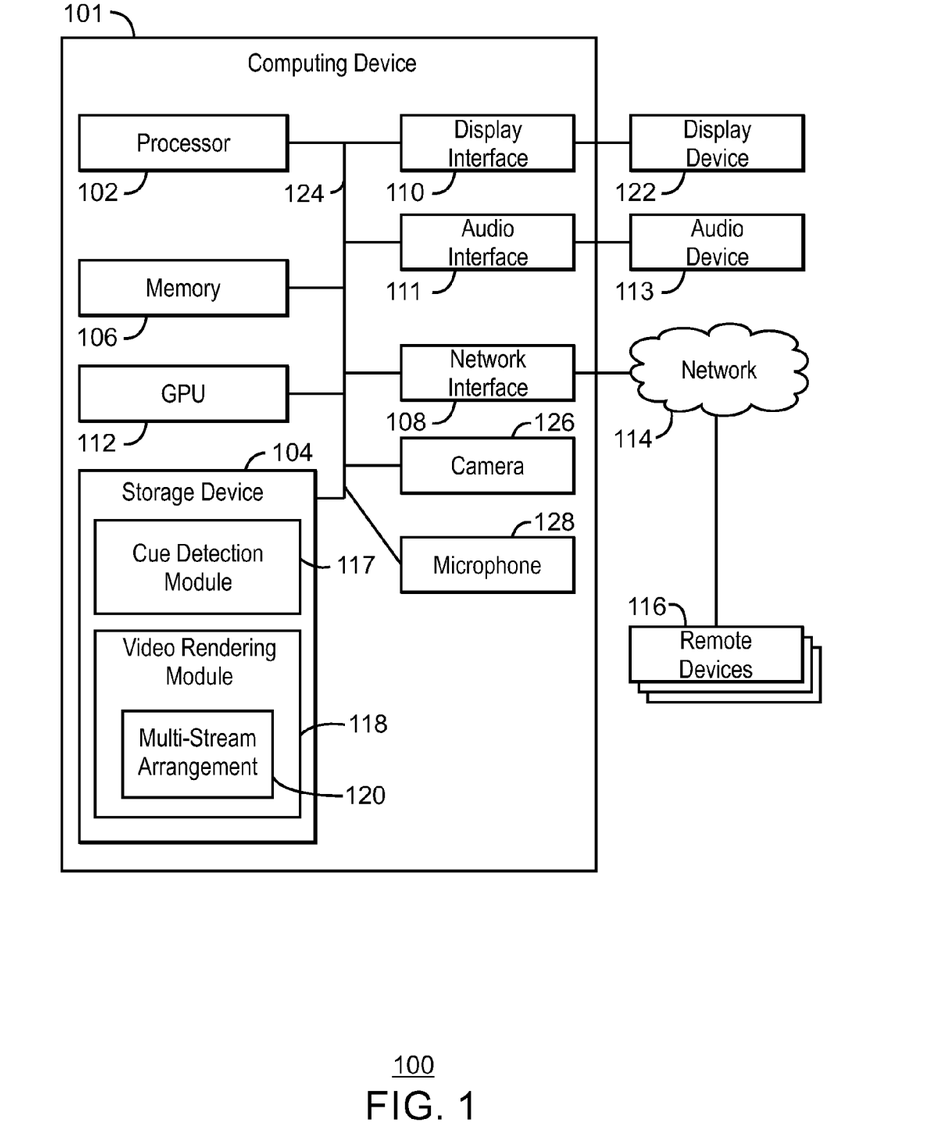
FIG. 1 is a block diagram of a computing system configured to render video images in a multiuser environment.

FIG. 1 is a block diagram of a computing system configured to render video images in a multiuser environment. The computing system 100 may include a computing device 101 having a processor 102, a storage device 104 comprising a non-transitory computer-readable medium, a memory device 106, a network interface 108, a display interface 110, a graphics processing unit (GPU) 112, an audio interface 111, and an audio device 113. The computing device 101 may communicate, via the network interface 108, with a network 114 to access remote devices 116.

The storage device 104 may include a video rendering module 118. The video rendering module 118 may include a multi-stream arrangement module 120. The multi-stream arrangement module 120 may be a set of instructions stored on the storage device 104. The instructions, when executed by the processor 102, direct the computing device 101 to perform operations. In some examples, the instructions are executed by the GPU 112. In either case, the instructions may include code to direct the processor 102 to receive two or more audiovisual streams from a remote site, such as from the remote devices 116. The audiovisual streams may be associated with video images to be rendered at a display device 122 associated with a local computing device, such as the computing device 101. The display device 122 may be a display screen such as a computer screen of the computing device 101. In some examples, the display device 122 may be a peripheral display device such as a projector or peripheral display screen. In some examples, the display device 122 may be an interactive device such as a touch screen display. The audiovisual streams may also be associated with sound generated by the audio device 111 via the audio interface 113.

The processor 102 may be a main processor that is adapted to execute the stored instructions. The processor 102 may be a single core processor, a multi-core processor, a computing cluster, or any number of other configurations. The processor 102 may be implemented as Complex Instruction Set Computer (CISC) or Reduced Instruction Set Computer (RISC) processors, x86 Instruction set compatible processors, multi-core, or any other microprocessor or central processing unit (CPU).

Figure 2:
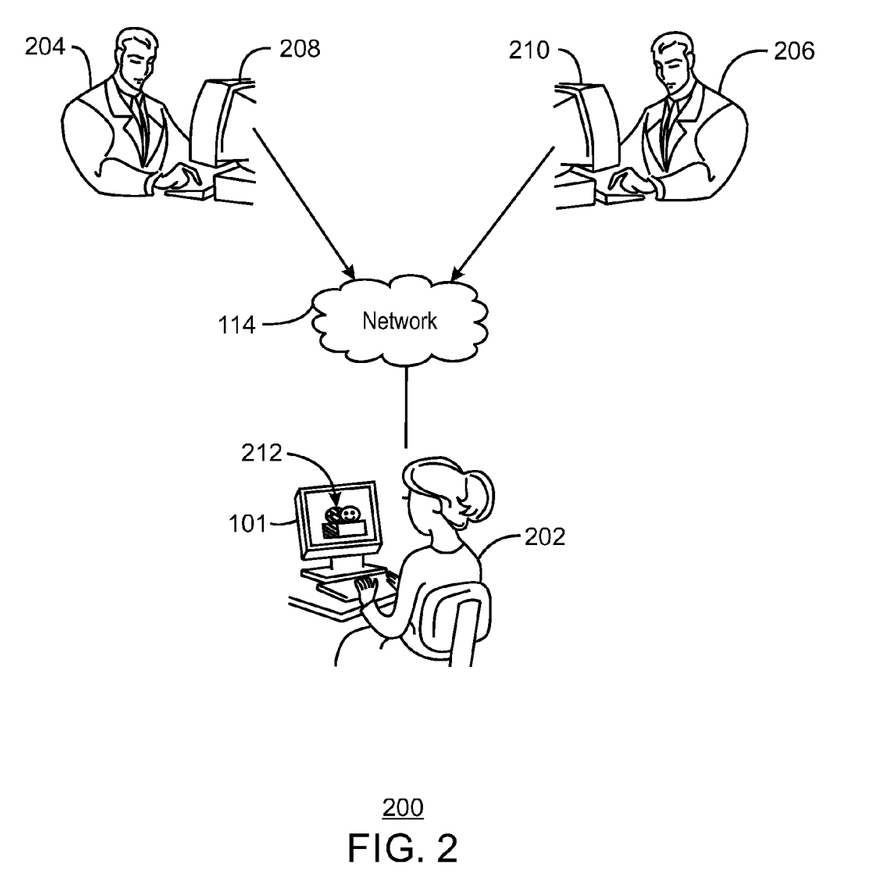
FIG. 2 illustrates the multiuser environment including video images associated with audiovisual streams rendered at a computing device.

The memory device 106 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The main processor 102 may be connected through a system bus 124 (e.g., PCI, ISA, PCI-Express, HyperTransport®, NuBus, etc.) to the network interface 108. The network interface 108 may enable the computing device 101 to communicate, via the network 114, with the remote devices 116. As illustrated in FIG. 2 below, each of the remote devices 116 provide incoming audiovisual streams to a local computing device, such as the computing device 101. The remote devices 116 may be computing devices, such as the computing device 101.

The multi-stream arrangement module 120 may include code to direct the processor 102 to render video images associated with the audiovisual streams at the display device 122 in an arrangement such that a part of a video image associated with one of the incoming audiovisual streams is relatively more opaque than a part of a video image associated with the other incoming audiovisual stream. For example, the multi-stream arrangement module 120 may direct the computing device 101 to render all the incoming images at the full screen size, but composite them using various levels of transparency so that a first incoming video image is relatively opaque while the instructions may direct the computing device 101 to render a second video image as relatively transparent when compared to the rendered first video image.

The arrangement of audiovisual streams is based on cues indicating activity associated with an audiovisual stream. In some embodiments, the cues may indicate an activity level associated with one of the remote devices 116 in comparison to another of the remote devices 116. Some cues can be derived from information present within the normal audiovisual stream. For example, movement within a video image, or an increase in sound activity in an audio signal, may be a cue indicating activity. In some examples, cues may be events indicating activity that may not be included in the audiovisual stream. For example, a touch event may be determined by an operating system of a computing device, such as one of the remote devices 116, that has received the touch event. In some embodiments, the operating system of the remote device may provide the activity indication to the computing device 101. In some examples, the cues may be determined at a transmitting end of the computing system 100. For example, the remote devices 116 may be configured to detect cues indicating activity, such as a touch event indicating that a user of at one of the remote devices 116 touched a touch screen of a remote device. In some examples, the cues may be determined at a receiving end of the computing system 100. For example, the computing device 101 may be configured to receive multiple audiovisual streams from the remote devices 116 and the computing device 101 may be configured to detect activity within the audiovisual stream based on one or more cues, discussed in more detail below.

The storage device 104 may include a cue detection module 117. The cue detection module 117 may be configured to detect cues in the audiovisual stream incoming from the remote devices 116. In some examples, the cue detection module 117 is configured to detect cues at the computing device 101 and provide the cue detection to remote devices 116.

As discussed above, the GPU 112 may carry out the instructions of the video rendering module 120, including rendering the video images associated with audiovisual streams at the display device 122 in an arrangement such that a part of a video image associated with one of the incoming audiovisual streams is relatively more opaque than a part of a video image associated with the other incoming audiovisual stream. Whether the instructions are carried out by the processor 102, or the GPU 112, or a combination of either one, the video images associated with audiovisual streams are arranged based on cues as discussed below in reference to FIG. 2.

The computing device 101 may include a camera 126 configured to capture video signals to be provided to the remote devices 116. In one example, the camera 126 may include functionality to determine depths in an image (for example, from stereo or using an active depth sensor) to distinguish distances that may exist between regions that are relatively near to the camera 126 when compared to regions that are relatively far from the camera 126. The computing device 101 may include a microphone 128. In some examples, the microphone 128 is a directional microphone configured to detect audio signals from a given direction. Each of the camera 126 and the microphone 128 may provide video signals and audio signals, respectively, in an audiovisual stream. Each of the audio and video signals may provide cues indicating activity within the audiovisual stream.

The block diagram of FIG. 1 is not intended to indicate that the computing device 101 is to include all of the components shown in FIG. 1. Further, the computing device 101 may include any number of additional components not shown in FIG. 1, depending on the details of the specific implementation.

FIG. 2 illustrates the multiuser environment including video images associated with audiovisual streams rendered at a computing device. As illustrated in FIG. 2, a first user 202 may view incoming video images associated with audiovisual streams from a second user 204 and a third user 206, respectively, via the network 114. The video images associated with incoming audiovisual streams may be arranged at the computing device 101 as indicated by the arrow 212, wherein the arrangement is configured to enable one of the video images associated with incoming audiovisual streams relatively more opaque than the other video images associated with incoming audiovisual streams. The second and third users 204, 206 are users at remote sites. The second user 204 may be associated with a computing device 208, and the third user 206 may be associated with a computing device 210. The computing devices 208, 210 are remote computing devices to the computing device 101, and in some examples the computing devices 208, 210 may be the remote devices 116 of FIG. 1. The audiovisual streams may be associated with audio streams from each of the computing devices 208, 210 including voices of the second user 204 and the third user 206. When two or more audiovisual streams are provided to the computing device 101, the video images associated with the audiovisual streams may be rendered at a display of the computing device 101 via a module such as the video rendering module 120 discussed above in reference to FIG. 2. In order for the user 202 to distinguish incoming video images associated with the audiovisual streams from two remote computing devices 208, 210, the video images associated with the incoming audiovisual streams may be arranged such that a part of the video images associated with one of the audiovisual streams is relatively more opaque than a part of the video images associated with the other audiovisual stream. As discussed in more detail below, the arrangement may include varying levels of opacity of the video images associated with the audiovisual streams, stacking video images associated with the audiovisual streams based on cues indicating activity, separating a foreground from a background of the video images associated with the audiovisual streams and combining the separated foregrounds via stacking or varying the levels of opacity, providing smaller windows of video images associated with the audiovisual streams that are relatively less active, or any combination of the arrangements discussed above. In some examples, the opacity of a given image is inversely proportional to an amount of detected activity.

Arranging the incoming video images that are associated with the audiovisual streams may be triggered by cues associated with each audiovisual stream indicating activity. In one example, an audio signal associated with the audiovisual stream provides a cue indicating activity. For example, a voice of the second user 204 may provide a cue indicating activity within the audiovisual stream of the second user 204 to the computing device 101. The computing device 101 may render a part of the video images associated with the audiovisual stream incoming from the computing device 208 to be relatively more opaque than a part of the video images associated with the audiovisual stream incoming from the computing device 210.

The cues indicating activity may be generated at a transmitting side or at a receiving side. For example, the computing device 101 may receive incoming audiovisual streams from each of the computing devices 210, 212. A cue may be generated at one or both of the computing devices 210, 212. The computing device 101 may generate cues indicating activity of the user 202.

In an example, a touch event associated with an incoming audiovisual stream is a cue indicating activity within the audiovisual stream. A touch event is a signal indicating that the user has touched a screen, via a touch screen for example, of the display of one of the computing devices 208, 210. A touch event may indicate activity of a user, such as user 204 illustrated in FIG. 2.

In an example, a video signal indicating movement of objects within the video signal is a cue indicating activity within the audiovisual stream. For example, the video signal may indicate movement of an object such as a waving hand of the user 204 or user 206. The movement of an object may indicate activity within the audiovisual stream.

In an example, a button may be used that when pressed indicates activity of a user. Thus, the cue may be a "push-to-talk" button. The cues may include any combination of the cues listed.

In some examples, the multi-stream arrangement module 120 of FIG. 1 includes instructions that when executed by the processor 102 direct the processor to include a feedback mechanism such that the computing device 101 may indicate to the user 202 that they are relatively less opaque to other users, such as users 204, 206. The computing device 101 may render the display device 122 to be relatively dark when the audiovisual stream outgoing from the computing device 101 indicates that the user is relatively less active than the audiovisual streams outgoing from each of the remote computing devices 208, 210. In other words, the computing device 101 may be configured to darken the display of the computing device 101 indicating that the video images associated with the outgoing audiovisual stream will be less opaque to other users based on the relative inactivity of the user 202.

Figure 3:
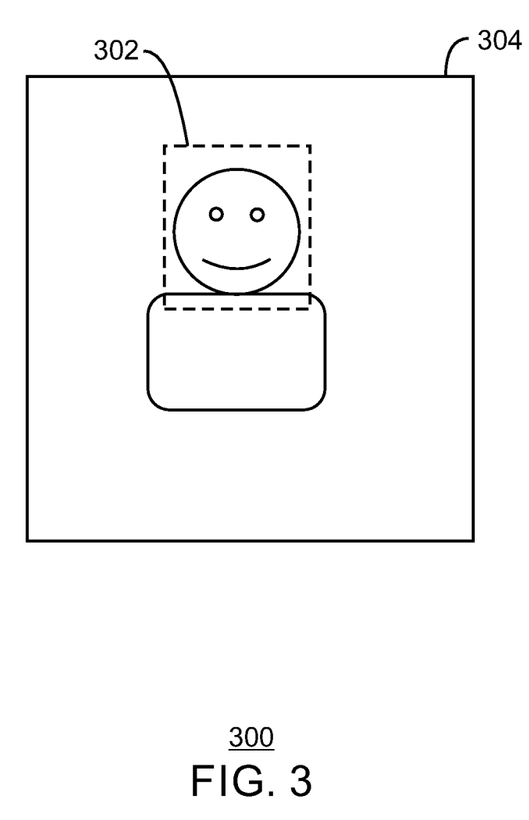
FIG. 3 is a diagram illustrating a region including a face to be rendered having an opacity level.

FIG. 3 is a diagram illustrating a region including a face to be rendered having an opacity level. A processor of the computing device 101, such as the processor 102 of FIG. 1, may include instructions thereon that direct the processor 102 to identify the face of a user in one of the video images associated with the audiovisual streams, as indicated by the dashed box 302. In an example, the instructions may direct the processor 102 to separate the face 302 of the user from the other objects of the video images associated with the audiovisual stream. The video images associated with the audiovisual streams may be rendered at a local display 304. The local display 304 may be a display device of a computing device, such as the display device 122 of the computing device 101 of FIG. 1. Rendering the video images associated with the audiovisual streams at the local display 304 may include rendering the video images associated with the audiovisual streams in an arrangement such that a part of video images associated with one of the audiovisual streams is relatively more opaque than a part of video images associated with the other audiovisual stream includes rendering the face 302 of the user to be displayed without other objects of the video images associated with the audiovisual stream being displayed. Further, rendering the face 302 may include rendering the face 302 with more opacity when the video images associated with the audiovisual stream including the face 302 indicates activity of the user based on the cues discussed above in reference to FIG. 2. For example, the face 302 may be rendered having a relatively high opacity with respect to video images associated with the other audiovisual streams when a cue, such as a voice of a user associated with the face 302 is detected as an audio signal cue. In examples, audio signals may be processed to determine whether a user is speaking. In some examples, the audio signal may be processed to determine characteristics such as frequency, pitch, tempo, and the like of the audio signal that may be associated with a voice of a user.

Figure 4:
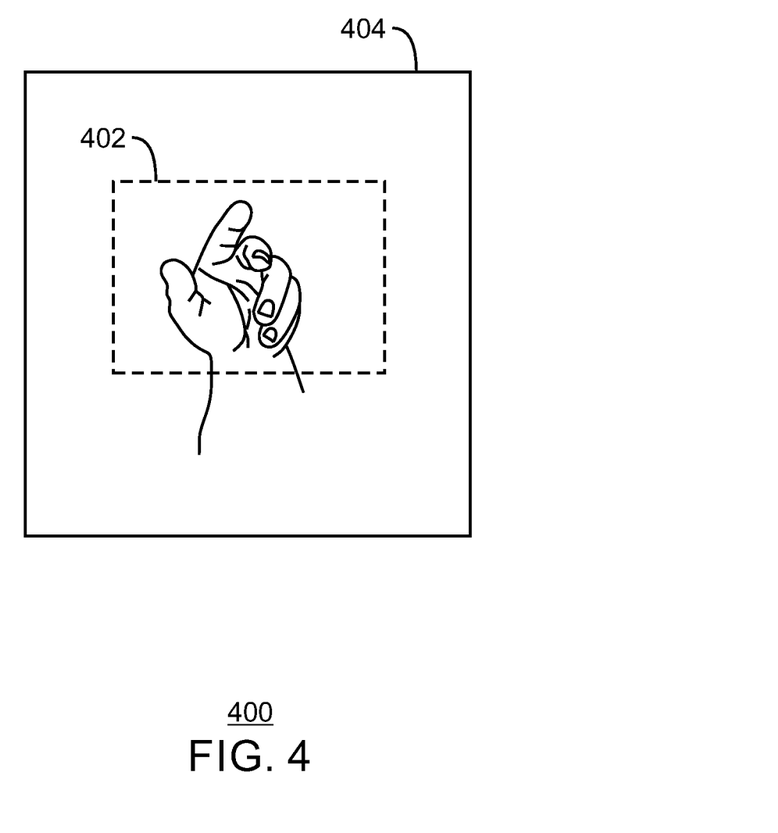
FIG. 4 is a diagram illustrating a region including a hand to be rendered having an opacity level.

FIG. 4 is a diagram illustrating a region including a hand to be rendered having an opacity level. The video images associated with the audiovisual streams may be rendered at a local display 404. In one example, the processor 102 of FIG. 1 may be directed to identify the hand as indicated by the dashed box 402. The hand 402 may be identified due to movement of the hand 402. The hand 402 may be rendered having a relatively high opacity than other regions within the video images associated with the audiovisual stream or than other regions of video images associated with the other incoming audiovisual streams. In one example, the hand 402 may be rendered having a high opacity in response to a cue such as a touch event. When the hand 402 touches a touch screen of a display of the remote computing device, the computing device may indicate a touch event. The hand 402 may be rendered as having relatively higher opacity during the touch event.

In an example, the hand 402 may move closer to a display of a computing device such as one of the computing devices 208, 210 of FIG. 2. In an example, a camera, such as the camera 126 of FIG. 1, may be configured to capture depth images wherein a three dimensional shape may be determined. Objects moving closer to the camera 126 may be rendered relatively more opaque than objects remaining relatively further away. In some examples, objects moving closer than a predetermined threshold may be rendered having a relatively high opacity level than objects that remain beyond the predetermined threshold. The predetermined threshold may be set by an administrator of a system, such as the system 100 of FIG. 1.

Figure 5:
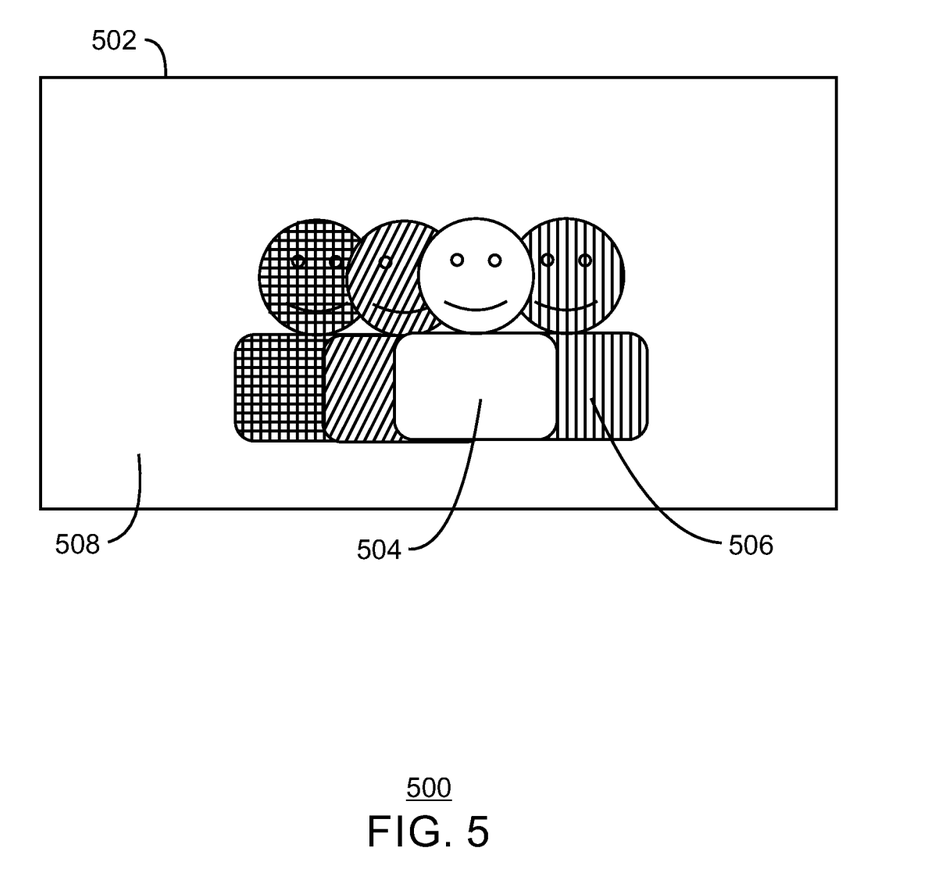
FIG. 5 is a diagram illustrating a stacked arrangement of multiple video images associated with the incoming audiovisual streams.

FIG. 5 is a diagram illustrating a stacked arrangement of multiple video images associated with the incoming audiovisual streams. In an example, the processor 102 of the computing device 101 may be configured to detect a three dimensional shape of each of the video images associated with the two or more audiovisual streams. The three dimensional shape indicates a foreground and a background. In another example, foreground/background separation can be estimated based on the image data alone, using a number of established techniques. The processor 102 of the computing device 101 may be configured to separate the foreground of video images associated with an audiovisual stream from the background of video images associated with an audiovisual stream. The foreground of video images associated with an audiovisual stream may be rendered with relatively high transparency and the background of video images associated with an audiovisual stream may be rendered with relatively low transparency.

As illustrated in FIG. 5, video images associated with the audiovisual streams may be rendered at a local display 502, wherein the local display 502 may be a display device such as the display device 122 of FIG. 1. Rendering the video images associated with the audiovisual streams at the local display 502 may include stacking the video images associated with the audiovisual streams based on activity detected within the audiovisual stream. In one example, stacking comprises rendering video images associated with the audiovisual stream with a relatively high activity level in the foreground and rendering video images associated with the audiovisual stream with a relatively low activity level in the background. As illustrated in FIG. 5, a part of a video images associated with the audiovisual stream may include an image of a user 504. The image of the user 504 may relatively opaque in comparison an image of a user 506.

The users 504, 506 illustrated in FIG. 5 may be the users 204, 206 of FIG. 2 wherein the respective audiovisual streams including the images of the users may be received from remote computing devices 208, 210. In one example, the image of the users 504, 506 in FIG. 5 may be foreground images wherein the foreground images may be separated from background images of their respective audiovisual streams. In one example, the users 504, 506 may be rendered on a neutral background 508 rather than blending backgrounds of each of the video images associated with the incoming audiovisual streams from the remote computing devices 208, 210.

In some examples, the stacking illustrated in FIG. 5 may be based, in part, on the cues discussed above in reference to FIG. 2. For example, the rendering of the image of user 504 may be stacked at least partially in front of the image of the user 506. The stacking order of the images of the users 504, 506 may be based on the activity of the audiovisual streams indicated by the cues. In some examples, the stacking order is based on a physical proximity of the users to their displays. For example, if user 204 is closer to a display with the user 204 than user 206 is to a display associated with the user 206 then the image associated with the user 204 is rendered in front of the image associated with the user 206.

In some examples, a computing device, such as the computing device 101 of FIG. 1 may process audio signals from the incoming audiovisual streams before sending these audio signals to the audio interface 111 for spatial audio rendering at the audio device 113. Spatial audio rendering may be based on the video images on the display device 122. For example, an audio signal associated with a user 506 on the right side of the display 502 is rendered in such a way that the user 202 may perceive the voice of the user 506 from the right side of the display. In one example, the spatial audio rendering can be done by stereo panning between left and right. In another example, head-related transfer function (HRTF) filtering of the audio signals can be used for spatial audio rendering.

Figure 6:
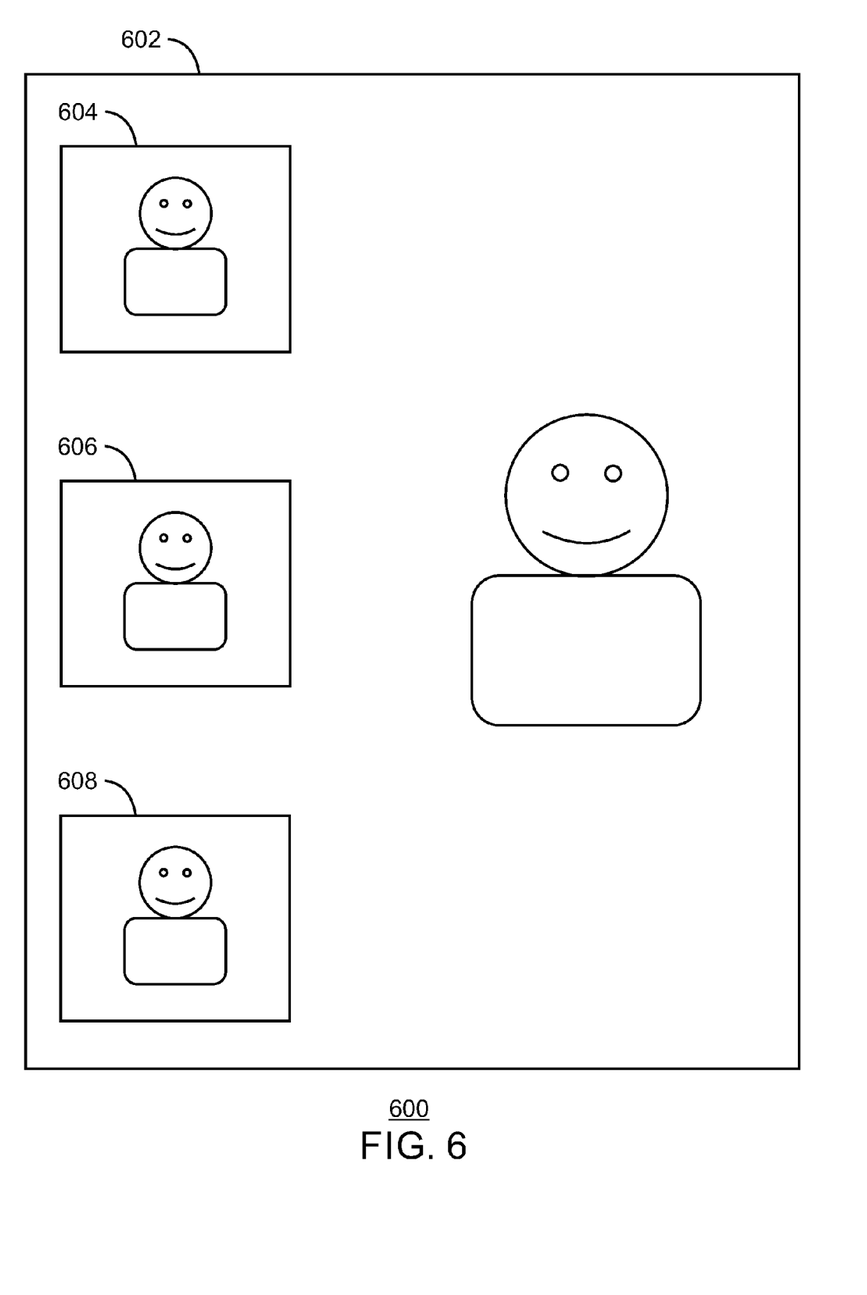
FIG. 6 is a diagram illustrating a tiled arrangement of multiple incoming audiovisual streams.

FIG. 6 is a diagram illustrating a tiled arrangement of video images associated with the multiple incoming audiovisual streams. As illustrated in FIG. 6, the arrangement includes an active window 602 for rendering the video images associated with the audiovisual stream having video signals indicating activity. The active window is relatively larger than another window for rendering the video images associated with the other audiovisual stream. For example, the window 602 may indicate that cues associated with the video images associated with the audiovisual stream of window 602 indicate activity within the audiovisual stream, while the windows 604, 606, 608 may be relatively smaller due to a lack of activity based on the cues associated with video images associated with the audiovisual streams of each the relatively smaller windows 604, 606, 608. In some examples, the window 602 may be rendered as relatively more opaque than the windows 604, 606, 608 based on levels of activity associated with the audiovisual streams of each window.

Figure 7:
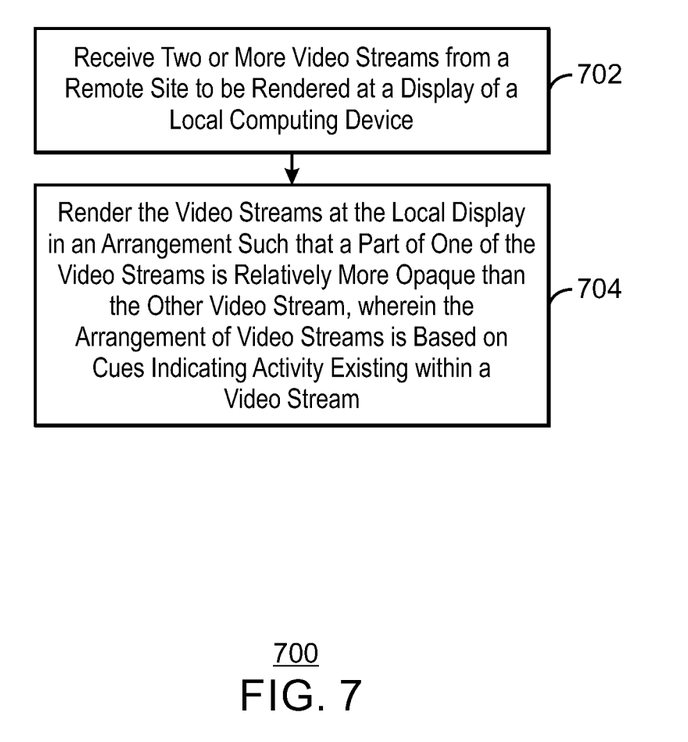
FIG. 7 is a block diagram illustrating a method for rendering video images associated with the audiovisual streams in a multiuser environment.

FIG. 7 is a block diagram illustrating a method for rendering video images associated with the audiovisual streams in a multiuser environment. The method 700 may include, at block 702, receiving two or more audiovisual streams from a remote site including video images to be rendered at a display of a local computing device. The two or more audiovisual streams may respectively be provided from remote computing devices, such as the remote computing devices 208, 210 of FIG. 2. The method 700 may include, at block 704, rendering the video images associated with the audiovisual streams at the local display in an arrangement such that a part of a video image associated with one of the audiovisual streams is relatively more opaque than a part of a video images associated with the other audiovisual stream. The arrangement of video images associated with the audiovisual streams is based on cues indicating activity existing within an audiovisual stream.

The cues may be determined by audio signals indicating voice activity existing within an audiovisual stream. The cues may include touch events indicating that a user has touched a screen of a remote display. The cues may be determined by video signals indicating movement of objects in the video signal. The cues may include a button configured to relay a signal indicating activity of the user. The cues may include proximity to the display. The cues may include any combination of the cues above.

In one example, a foreground and a background of an image are detected and separated. The rendering the video images associated with the audiovisual streams may include, at block 704, such that a part of a video image associated with one of the audiovisual streams is relatively more visible may include rendering a foreground of an video image associated with the audiovisual stream with relatively high activity with relatively high opacity and rendering the background of the video images associated with the audiovisual stream with relatively low activity with relatively low opacity. The method 700 may include separating the foreground (the user) image from the background (their local environment) image by detecting a three dimensional shape of each of the video images associated with the two or more audiovisual streams, or by other techniques to separate a foreground of an image from a background of an image. The method 700 may include separating the foreground of a video image associated with the audiovisual stream from the background of the audiovisual stream. Further, the method 700 may include rendering the foreground of a video image associated with the audiovisual stream with relatively high opacity and rendering the background of a video image associated with the audiovisual stream with relatively low opacity.

In one example, the method 700 may include identifying a face of a user in one of the video images associated with the audiovisual streams. Once the face of a user in one of the video images associated with the audiovisual streams has been identified, the method 700 may include separating the face of the user from other objects of the video image associated with the audiovisual stream. Rendering the video images associated with the audiovisual streams at the local display in an arrangement such that a part of one of the video images associated with the audiovisual streams is relatively more opaque than the video images associated with the other audiovisual stream includes rendering the face of the user without the other objects of the video images associated with the audiovisual stream.

Figure 8:
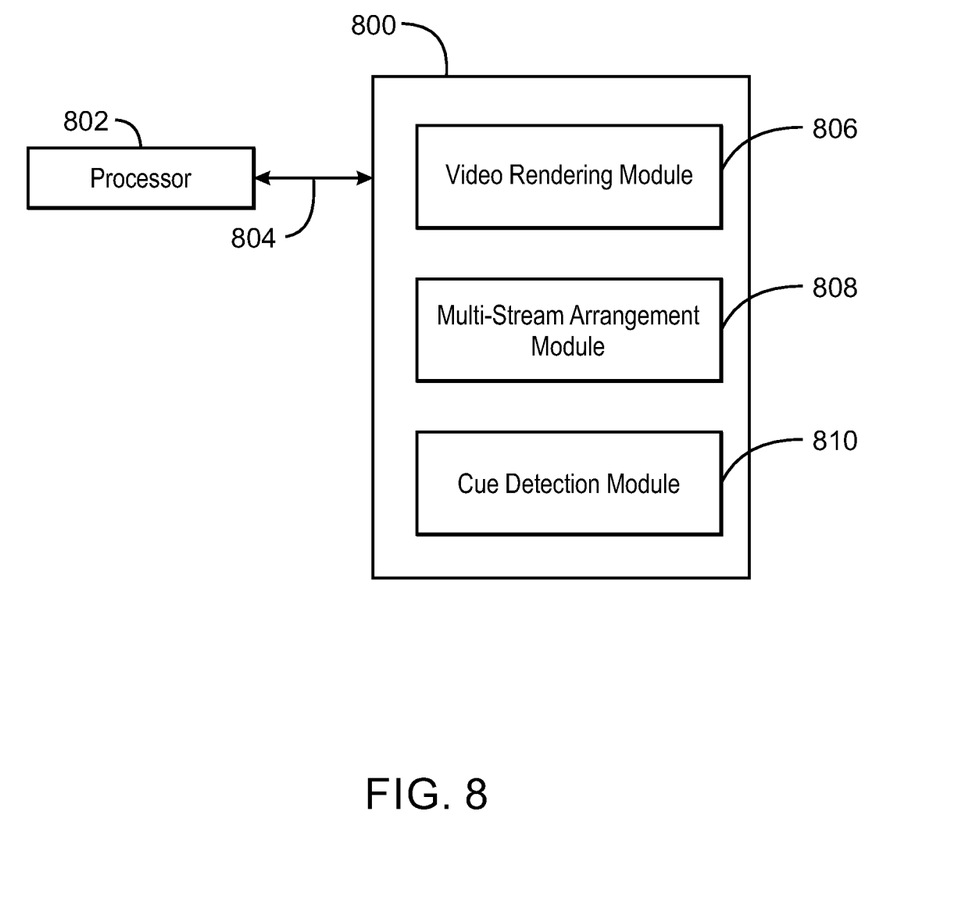
FIG. 8 is a block diagram showing a tangible machine-readable medium that stores code adapted to arrange video images associated with audiovisual streams in a multi-stream environment.

FIG. 8 is a block diagram showing a tangible machine-readable medium that stores code adapted to arrange video images associated with audiovisual streams in a multi-stream environment. The computer-readable medium is generally referred to by the reference number 800. The computer-readable medium 800 can comprise Random Access Memory (RAM), a hard disk drive, an array of hard disk drives, an optical drive, an array of optical drives, a non-volatile memory, a Universal Serial Bus (USB) flash drive, a DVD, a CD, and the like. In one embodiment of the present invention, the computer-readable medium 800 can be accessed by a processor 802 over a computer bus 804.

The various software components discussed herein can be stored on the tangible, non-transitory computer-readable medium 800 as indicated in FIG. 8. For example, a first block 806 can include a video rendering module configured to render incoming video images associated with incoming audiovisual streams at a display device. A second block 808 can include a multi-stream arrangement module configured to arrange two or more video images associated with the incoming audiovisual streams. The video images associated with the audiovisual streams may be arranged such that one of the video images associated with the audiovisual streams is relatively more opaque than the video images associated with the other audiovisual stream. A third block 810 can include a cue detection module configured to detect activity in an audiovisual stream.

Although shown as contiguous blocks, the software components can be stored in any order or configuration. For example, if the computer-readable medium 800 is a hard drive, the software components can be stored in non-contiguous, or even overlapping, sectors.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for multi-user videoconferencing, comprising:
   receiving two or more audiovisual streams having video images from a remote site to be rendered at a local display of a local computing device; and
   rendering video images associated with the audiovisual streams at the local display in an arrangement such that a part of a video image associated with one of the audiovisual streams is relatively more opaque than a part of a video image associated with the other audiovisual stream, wherein the arrangement of video images is based on cues indicating activity associated with individual audiovisual streams, and wherein a level of opacity of the video images is changed proportional to an amount of the activity associated with the individual audiovisual streams.

2. The method of claim 1, wherein the arrangement comprises an active window for rendering the video images associated with the audiovisual stream having video signals indicating activity, and wherein the active window is relatively larger than another window for rendering the video images associated with the other audiovisual stream.

3. The method of claim 1, the cues comprising:
   audio signals indicating activity existing within an audiovisual stream;
   touch events indicating that a user has touched a screen of a remote display;
   signals indicating movement of objects in the video signal;
   video signals indicating a proximity of a user to the remote display;
   a button configured to relay a signal indicating activity of the user; or
   any combination of the cues above.

4. The method of claim 1, wherein rendering video images associated with the audiovisual streams at the local display in an arrangement comprises:
   decreasing the opacity of video images associated with an audiovisual stream based on an activity level detected within the audiovisual stream;
   combining the video images associated with the audiovisual streams based on activity detected within the audiovisual stream, wherein combining comprises rendering all of the video images associated with the remote audiovisual streams so that those with a relatively high opacity are more visible than those with a relatively low opacity; or
   any combination of decreasing the opacity of the video images associated with the audiovisual stream and combining the video images associated with the audiovisual streams based on activity detected.

5. The method of claim 1, wherein rendering the video images associated with the audiovisual streams such that a part of one of the video images associated with the audiovisual streams is relatively more opaque than a part of the video images associated with the other audiovisual stream comprises:
   rendering a foreground of video images associated with an audiovisual stream with relatively high opacity and rendering a background of video images associated with an audiovisual stream with relatively low opacity;
   stacking video images associated with the audiovisual streams based on activity detected within the audiovisual stream, wherein stacking comprises rendering video images associated with an audiovisual stream with a relatively high activity level in the foreground and rendering video images associated with an audiovisual stream with a relatively low activity level in the background; or
   any combination of the above.

6. The method of claim 1, comprising providing visual feedback comprising: darkening the local display to indicate that video images associated with outgoing audiovisual stream is less opaque at a remote display than other video images associated with incoming audiovisual streams at the remote display.

7. The method of claim 1, comprising:
   identifying a face of a user in the video images associated with the audiovisual streams with relatively high activity; and
   separating the face of the user from other objects of the video images associated with the audiovisual stream, wherein rendering the video images comprises rendering the face of the user with relatively high opacity and rendering the other objects with relatively low opacity.

8. The method of claim 1, comprising rendering audio signals associated with the audiovisual stream based on spatial disposition of objects in a video image associated with the audiovisual stream.

9. A system for multi-user videoconferencing, the system comprising:
   a processor; and
   a memory device that stores computer-readable instructions that, when executed by the processor, direct the processor to:
      render video images associated with two or more incoming audiovisual streams from remote sites at a local display in an arrangement such that a part of a video image associated with one of the audiovisual streams is relatively more opaque than a part of a video image associated with the other audiovisual stream, wherein the arrangement of video images is based on cues indicating activity associated with individual audiovisual streams, and wherein a level of opacity of the video images is changed proportional to an amount of the activity associated with the individual audiovisual streams.

10. The system of claim 9, wherein the arrangement comprises an active window for rendering video images associated with the audiovisual stream having video signals indicating activity, and wherein the active window is relatively larger than another window for rendering video images associated with the other audiovisual stream.

11. The system of claim 9, the cues comprising:
    audio signals indicating activity existing within an audiovisual stream;
    touch events indicating that a user has touched a screen of a remote display;

signals indicating movement of objects in the video signal;
video signals indicating a proximity of a user to the remote display;
a button configured to relay a signal indicating activity of the user; or
any combination of the cues above.

12. The system of claim 9, wherein video images are rendered in arrangement via instructions that, when executed by the processor, direct the processor to:
decrease the opacity of video images associated with an audiovisual stream based on an activity level detected within the audiovisual stream;
combine the video images associated with the audiovisual streams based on activity detected within the audiovisual stream, wherein combining comprises rendering all of the video images associated with the remote audiovisual streams so that those with a relatively high opacity are more visible than those with a relatively low opacity; or
any combination of decreasing the opacity of the video images associated with the audiovisual stream and combining the video images associated with the audiovisual streams based on activity detected.

13. The system of claim 9, wherein rendering video images associated with the audiovisual streams such that a part of one of the video images associated with the audiovisual streams is relatively more opaque than a part of the video images associated with the other audiovisual stream via instructions that, when executed by the processor, direct the processor to:
render a foreground of video images associated with an audiovisual stream with relatively high opacity and rendering a background of video images associated with an audiovisual stream with relatively low opacity;
stack video images associated with the audiovisual streams based on activity detected within the audiovisual stream, wherein stacking comprises rendering video images associated with an audiovisual stream with a relatively high activity level in the foreground and rendering video images associated with an audiovisual stream with a relatively low activity level in the background; or
any combination of the above.

14. The system of claim 9, comprising a visual feedback mechanism, comprising instructions to direct the processor to darken the local display to indicate that video images associated with an outgoing audiovisual stream is less opaque at a remote display than other video images associated with incoming audiovisual streams at the remote display.

15. The system of claim 9, wherein the instructions direct the processor to:
identify a face of a user in the video images associated with the audiovisual streams with relatively high activity; and
separate the face of the user from the other objects of the video images associated with the audiovisual stream, wherein rendering the video images comprises rendering the face of the user with relatively high opacity and rendering the other objects with relatively low opacity.

16. The system of claim 9, wherein the instructions direct the processor to: render audio signals associated with the audiovisual stream based on spatial disposition of objects in a video image associated with the audiovisual stream.

17. A non-transitory, tangible, computer-readable storage device, comprising code configured to direct a processor to:
receive two or more audiovisual streams having video images from a remote site to be rendered at a display; and
render video images associated with the audiovisual streams at the display in an arrangement such that a part of a video image associated with one of the audiovisual streams is relatively more opaque than a part of a video image associated with the other audiovisual stream, wherein the arrangement of video images is based on cues indicating activity associated with individual audiovisual streams, and wherein a level of opacity of the video images is changed proportional to an amount of the activity associated with the individual audiovisual streams.

18. The computer-readable storage device of claim 17, the cues comprising:
audio signals indicating activity existing within an audiovisual stream;
touch events indicating that a user has touched a screen of a remote display;
signals indicating a proximity of a user to the remote display;
video signals indicating movement of objects in the video signal;
a button configured to relay a signal indicating activity of the user; or
any combination of the cues above.

19. The computer-readable storage device of claim 17, wherein video images are rendered in arrangement via code to direct the processor to:
decrease the opacity of video images associated with an audiovisual stream based on an activity level detected within the audiovisual stream;
combine the video images associated with the audiovisual streams based on activity detected within the audiovisual stream, wherein combining comprises rendering all of the video images associated with the remote audiovisual streams so that those with a relatively high opacity are more visible than those with a relatively low opacity; or
any combination of decreasing the opacity of the video images associated with the audiovisual stream and combining the video images associated with the audiovisual streams based on activity detected.

20. The computer-readable storage device of claim 17, wherein rendering video images associated with the audiovisual streams such that a part of one of the video images associated with the audiovisual streams is relatively more opaque than a part of the video images associated with the other audiovisual stream is carried out by code to direct the processor to:
render a foreground of video images associated with an audiovisual stream with relatively high opacity and rendering a background of video images associated with an audiovisual stream with relatively low opacity;
stack video images associated with the audiovisual streams based on activity detected within the audiovisual stream, wherein stacking comprises rendering video images associated with an audiovisual stream with a relatively high activity level in the foreground and rendering video images associated with an audiovisual stream with a relatively low activity level in the background; or
any combination of the above.

* * * * *